(12) United States Patent
Abrams

(10) Patent No.: US 7,799,164 B2
(45) Date of Patent: Sep. 21, 2010

(54) FLOCKED ARTICLES HAVING NONCOMPATIBLE INSERT AND POROUS FILM

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 788 days.

(21) Appl. No.: 11/460,519

(22) Filed: Jul. 27, 2006

(65) Prior Publication Data

US 2007/0026189 A1    Feb. 1, 2007

Related U.S. Application Data

(60) Provisional application No. 60/703,925, filed on Jul. 28, 2005, provisional application No. 60/704,681, filed on Aug. 1, 2005, provisional application No. 60/707,577, filed on Aug. 11, 2005, provisional application No. 60/710,368, filed on Aug. 22, 2005, provisional application No. 60/716,869, filed on Sep. 13, 2005, provisional application No. 60/719,469, filed on Sep. 21, 2005, provisional application No. 60/779,317, filed on Mar. 3, 2006, provisional application No. 60/786,528, filed on Mar. 27, 2006.

(51) Int. Cl.
| | |
|---|---|
| *B32B 37/12* | (2006.01) |
| *B32B 38/04* | (2006.01) |
| *B44C 1/26* | (2006.01) |
| *B05D 1/16* | (2006.01) |

(52) U.S. Cl. .................. 156/252; 156/62.2; 156/256; 428/67; 428/78; 428/90; 428/138

(58) Field of Classification Search ................ 156/62.2, 156/239, 240, 252, 256, 263; 428/90, 67, 428/78, 138
See application file for complete search history.

(56) References Cited

U.S. PATENT DOCUMENTS

| | | | |
|---|---|---|---|
| 1,580,717 | A | 4/1926 | Flick |
| 1,905,989 | A | 4/1933 | Safir et al. |
| 1,975,542 | A | 10/1934 | Forsdale |
| 1,992,676 | A | 2/1935 | Schwarz |
| 2,047,978 | A | 7/1936 | Maclaurin |
| 2,275,617 | A | 3/1942 | Duerr et al. |
| 2,278,227 | A | 3/1942 | Thackeray et al. |
| 2,477,912 | A | 8/1949 | Vallandigham |
| 2,592,602 | A | 4/1952 | Saks |
| 2,636,837 | A | 4/1953 | Summers |
| 2,835,576 | A | 5/1958 | Ensink |
| 2,981,588 | A | 4/1961 | Hyman |

(Continued)

FOREIGN PATENT DOCUMENTS

| | | |
|---|---|---|
| AU | 606651 | 2/1991 |

(Continued)

OTHER PUBLICATIONS

International Search Report for International (PCT) Patent Application No. PCT/US2006/029410, mailed Nov. 19, 2007.

(Continued)

*Primary Examiner*—Michael A Tolin
(74) *Attorney, Agent, or Firm*—Sheridan Ross, P.C.

(57) ABSTRACT

The present invention is directed to flocked articles comprising a metallized film and methods of manufacturing such articles.

12 Claims, 8 Drawing Sheets

U.S. PATENT DOCUMENTS

| | | | |
|---|---|---|---|
| 2,999,763 | A | 9/1961 | Sommer |
| 3,099,514 | A | 7/1963 | Haber |
| 3,215,584 | A | 11/1965 | McConnell et al. |
| 3,314,845 | A | 4/1967 | Perri |
| 3,351,479 | A | 11/1967 | Fairchild |
| 3,377,232 | A | 4/1968 | Mencock et al. |
| 3,432,446 | A | 3/1969 | Coppeta |
| 3,459,579 | A | 8/1969 | Newman |
| 3,496,054 | A | 2/1970 | Baigas |
| 3,529,986 | A | 9/1970 | Kappas et al. |
| 3,565,742 | A | 2/1971 | Stephens et al. |
| 3,591,401 | A | 7/1971 | Snyder et al. |
| 3,630,990 | A | 12/1971 | Neal |
| 3,639,149 | A | 2/1972 | Spalding |
| 3,657,060 | A | 4/1972 | Haigh |
| 3,660,200 | A | 5/1972 | Anderson et al. |
| 3,674,611 | A | 7/1972 | Petry et al. |
| 3,772,132 | A | 11/1973 | Dulin, Jr. |
| 3,793,050 | A | 2/1974 | Mumpower, Jr. |
| 3,803,453 | A | 4/1974 | Hull |
| 3,837,946 | A | 9/1974 | Gribbin |
| 3,887,737 | A | 6/1975 | Baxter et al. |
| 3,900,676 | A | 8/1975 | Alderson |
| 3,903,331 | A | 9/1975 | Klein |
| 3,917,883 | A | 11/1975 | Jepson |
| 3,918,895 | A | 11/1975 | Mizuno |
| 3,928,706 | A | 12/1975 | Gibbons |
| 3,936,554 | A | 2/1976 | Squier |
| 3,956,552 | A | 5/1976 | Geary |
| 3,961,116 | A | 6/1976 | Klein |
| 3,969,559 | A | 7/1976 | Boe |
| 3,979,538 | A | 9/1976 | Gilman et al. |
| 4,018,956 | A | 4/1977 | Casey |
| 4,025,678 | A | 5/1977 | Frank |
| 4,034,134 | A | 7/1977 | Gregorian et al. |
| 4,035,532 | A | 7/1977 | Gregorian et al. |
| 4,062,992 | A | 12/1977 | Power et al. |
| 4,098,946 | A | 7/1978 | Fuzek |
| 4,142,929 | A | 3/1979 | Otomine et al. |
| 4,201,810 | A | 5/1980 | Higashiguchi |
| 4,216,281 | A | 8/1980 | O'Rell et al. |
| 4,218,501 | A | 8/1980 | Kameya et al. |
| 4,228,225 | A | 10/1980 | O'Rell et al. |
| 4,238,190 | A | 12/1980 | Rejto |
| 4,263,373 | A | 4/1981 | McCaskey et al. |
| 4,264,691 | A | 4/1981 | O'Rell et al. |
| 4,265,985 | A | 5/1981 | O'Rell et al. |
| 4,269,885 | A | 5/1981 | Mahn |
| 4,273,817 | A | 6/1981 | Matsuo et al. |
| 4,282,278 | A | 8/1981 | Higashiguchi |
| 4,292,100 | A | 9/1981 | Higashiguchi |
| 4,294,577 | A | 10/1981 | Bernard |
| 4,294,641 | A | 10/1981 | Reed et al. |
| 4,308,296 | A | 12/1981 | Chitouras |
| 4,314,813 | A | 2/1982 | Masaki |
| 4,319,942 | A | 3/1982 | Brenner |
| 4,330,602 | A | 5/1982 | O'Rell et al. |
| 4,340,632 | A | 7/1982 | Wells et al. |
| 4,362,773 | A | 12/1982 | Shikinami |
| 4,368,231 | A | 1/1983 | Egert et al. |
| 4,368,243 | A | 1/1983 | O'Rell et al. |
| 4,369,236 | A | 1/1983 | O'Rell et al. |
| 4,390,387 | A | 6/1983 | Mahn |
| 4,396,662 | A | 8/1983 | Higashiguchi |
| 4,413,019 | A | 11/1983 | Brenner |
| 4,418,106 | A | 11/1983 | Landler et al. |
| 4,430,372 | A | 2/1984 | Knoke et al. |
| 4,438,533 | A | 3/1984 | Hefele |
| 4,465,723 | A | 8/1984 | Knoke et al. |
| 4,588,629 | A | 5/1986 | Taylor |
| 4,599,262 | A | 7/1986 | Schulte et al. |
| 4,610,904 | A | 9/1986 | Mahn, Sr. et al. |
| 4,650,533 | A | 3/1987 | Parker et al. |
| 4,652,478 | A | 3/1987 | Maii |
| 4,687,527 | A | 8/1987 | Higashiguchi |
| 4,741,791 | A | 5/1988 | Howard et al. |
| 4,810,549 | A | 3/1989 | Abrams et al. |
| 4,812,357 | A | 3/1989 | O'Rell et al. |
| 4,861,644 | A | 8/1989 | Young et al. |
| 4,895,748 | A | 1/1990 | Squires |
| 4,923,848 | A | 5/1990 | Akada et al. |
| 4,931,125 | A | 6/1990 | Volkmann et al. |
| 4,980,216 | A | 12/1990 | Rompp |
| 4,981,750 | A | 1/1991 | Murphy et al. |
| 5,008,130 | A | 4/1991 | Lenards |
| 5,047,103 | A | 9/1991 | Abrams et al. |
| 5,059,452 | A | 10/1991 | Squires |
| 5,066,537 | A | 11/1991 | O'Rell et al. |
| 5,077,116 | A | 12/1991 | Lefkowitz |
| 5,112,423 | A | 5/1992 | Liebe, Jr. |
| 5,115,104 | A | 5/1992 | Bunyan |
| 5,126,182 | A | 6/1992 | Lumb et al. |
| 5,155,163 | A | 10/1992 | Abeywardena et al. |
| 5,196,262 | A | 3/1993 | Schwarz et al. |
| 5,198,277 | A | 3/1993 | Hamilton et al. |
| 5,207,851 | A | 5/1993 | Abrams |
| 5,238,737 | A | 8/1993 | Burkhardt et al. |
| 5,298,031 | A | 3/1994 | Gabay et al. |
| 5,326,391 | A | 7/1994 | Anderson et al. |
| 5,338,603 | A | 8/1994 | Mahn et al. |
| 5,346,746 | A | 9/1994 | Abrams |
| 5,347,927 | A | 9/1994 | Berna et al. |
| 5,352,507 | A | 10/1994 | Bresson et al. |
| 5,383,996 | A | 1/1995 | Dressler |
| 5,403,884 | A | 4/1995 | Perlinski |
| 5,480,506 | A | 1/1996 | Mahn, Sr. et al. |
| 5,529,650 | A | 6/1996 | Bowers et al. |
| 5,543,195 | A | 8/1996 | Squires et al. |
| 5,597,633 | A | 1/1997 | Mecke et al. |
| 5,597,637 | A | 1/1997 | Abrams et al. |
| 5,681,420 | A * | 10/1997 | Yamane ..................... 156/387 |
| 5,685,223 | A | 11/1997 | Vermuelen et al. |
| 5,756,180 | A | 5/1998 | Squires et al. |
| 5,766,397 | A | 6/1998 | Jones |
| 5,771,796 | A | 6/1998 | Morrison et al. |
| 5,804,007 | A | 9/1998 | Asano |
| 5,858,156 | A | 1/1999 | Abrams et al. |
| 5,863,633 | A | 1/1999 | Squires et al. |
| 6,010,764 | A | 1/2000 | Abrams |
| 6,025,068 | A | 2/2000 | Pekala |
| 6,083,332 | A | 7/2000 | Abrams |
| 6,110,560 | A | 8/2000 | Abrams |
| 6,114,023 | A | 9/2000 | Schwarz et al. |
| 6,178,680 | B1 | 1/2001 | Sloot |
| 6,224,707 | B1 | 5/2001 | Lion |
| 6,247,215 | B1 | 6/2001 | Van Alboom et al. |
| 6,249,297 | B1 | 6/2001 | Lion |
| 6,350,504 | B1 | 2/2002 | Alboom et al. |
| 6,361,855 | B2 | 3/2002 | Mahn, Jr. et al. |
| 6,376,041 | B1 | 4/2002 | Morrison et al. |
| 6,436,506 | B1 | 8/2002 | Pinter et al. |
| 6,489,038 | B1 | 12/2002 | Sperlich et al. |
| 6,544,634 | B1 | 4/2003 | Abrams et al. |
| 6,676,796 | B2 | 1/2004 | Pinter et al. |
| 6,774,067 | B2 | 8/2004 | Demott et al. |
| 6,841,240 | B2 | 1/2005 | Gorny et al. |
| 6,913,714 | B2 | 7/2005 | Liu et al. |
| 6,924,000 | B2 | 8/2005 | Tallmadge |
| 6,929,771 | B1 | 8/2005 | Abrams |
| 6,977,023 | B2 | 12/2005 | Abrams |
| 7,021,549 | B2 | 4/2006 | O'Rell et al. |
| 7,135,518 | B2 | 11/2006 | Bandou et al. |
| 7,229,680 | B1 | 6/2007 | Crompton |
| 7,393,516 | B2 * | 7/2008 | Seo et al. ..................... 423/508 |

| | | | |
|---|---|---|---|
| 7,461,444 B2 | 12/2008 | Deaett et al. | |
| 2001/0008039 A1 | 7/2001 | Alboom et al. | |
| 2001/0008672 A1 | 7/2001 | Norvell et al. | |
| 2002/0009571 A1 | 1/2002 | Abrams | |
| 2002/0098329 A1 | 7/2002 | Abrams | |
| 2003/0129353 A1 | 7/2003 | Abrams | |
| 2003/0186019 A1 | 10/2003 | Abrams | |
| 2003/0207072 A1 | 11/2003 | Abrams | |
| 2003/0211279 A1 | 11/2003 | Abrams | |
| 2004/0010093 A1 | 1/2004 | Wefringhaus et al. | |
| 2004/0033334 A1 | 2/2004 | Merovitz | |
| 2004/0050482 A1 | 3/2004 | Abrams | |
| 2004/0053001 A1 | 3/2004 | Abrams | |
| 2004/0055692 A1 | 3/2004 | Abrams | |
| 2004/0058120 A1 | 3/2004 | Abrams | |
| 2004/0081791 A1 | 4/2004 | Abrams | |
| 2004/0170799 A1 | 9/2004 | Carr et al. | |
| 2005/0081985 A1 | 4/2005 | Abrams | |
| 2005/0124734 A1 | 6/2005 | Hucks et al. | |
| 2005/0158508 A1 | 7/2005 | Abrams | |
| 2005/0159575 A1 | 7/2005 | Rische et al. | |
| 2005/0196594 A1 | 9/2005 | O'Rell et al. | |
| 2005/0260378 A1 | 11/2005 | Bernabeu | |
| 2005/0266204 A1 | 12/2005 | Abrams | |
| 2005/0268407 A1 | 12/2005 | Abrams | |
| 2006/0026778 A1 | 2/2006 | Lion | |
| 2006/0029767 A1 | 2/2006 | Lion | |
| 2006/0142405 A1 | 6/2006 | Kijima | |
| 2006/0150300 A1 | 7/2006 | Hassan et al. | |
| 2006/0160943 A1 | 7/2006 | Weir | |
| 2006/0251852 A1 | 11/2006 | Abrams | |
| 2006/0257618 A1 | 11/2006 | Bernabeu | |
| 2007/0003761 A1 | 1/2007 | Miyazono et al. | |
| 2007/0289688 A1 | 12/2007 | Abrams | |
| 2008/0003399 A1 | 1/2008 | Abrams | |
| 2008/0006968 A1 | 1/2008 | Abrams | |
| 2008/0050548 A1 | 2/2008 | Abrams | |
| 2008/0095973 A1 | 4/2008 | Abrams | |
| 2008/0111047 A1 | 5/2008 | Abrams | |
| 2008/0113144 A1 | 5/2008 | Abrams | |
| 2008/0124503 A1 | 5/2008 | Abrams | |
| 2008/0187706 A1 | 8/2008 | Lion et al. | |

FOREIGN PATENT DOCUMENTS

| | | |
|---|---|---|
| AU | 653994 | 10/1994 |
| CA | 757595 | 4/1967 |
| CA | 2010076 | 8/1990 |
| CA | 1306411 | 8/1992 |
| CA | 2064300 | 9/1992 |
| DD | 202835 | 10/1983 |
| DE | 3004560 | 8/1981 |
| DE | 19707381 | 8/1998 |
| DE | 19734316 | 2/1999 |
| EP | 0122656 | 10/1984 |
| EP | 0210304 | 2/1987 |
| EP | 0280296 | 8/1988 |
| EP | 0351079 | 1/1990 |
| EP | 0506601 | 9/1992 |
| EP | 0685014 | 12/1995 |
| EP | 0913271 | 10/1998 |
| EP | 0989227 | 3/2000 |
| EP | 1072712 | 1/2001 |
| EP | 1598463 | 11/2005 |
| FR | 2543984 | 10/1984 |
| FR | 2659094 | 9/1991 |
| FR | 2784619 | 4/2000 |
| FR | 2846202 | 4/2004 |
| FR | 2881149 | 7/2006 |
| GB | 1171296 | 11/1969 |
| GB | 1466271 | 3/1977 |
| GB | 2065031 | 6/1981 |
| GB | 2101932 | 1/1983 |
| GB | 2126951 | 4/1984 |
| GB | 2214869 | 9/1989 |
| GB | 0506601 | 9/1992 |
| JP | 71007184 | 6/1965 |
| JP | 55079143 | 6/1980 |
| JP | 55-147171 | 11/1980 |
| JP | 56058824 | 5/1981 |
| JP | 56107080 | 8/1981 |
| JP | 56108565 | 8/1981 |
| JP | 56141877 | 11/1981 |
| JP | 58062027 | 4/1983 |
| JP | S61-146368 | 7/1986 |
| JP | 62-033576 | 2/1987 |
| JP | 63118544 | 5/1988 |
| JP | 64-014021 | 1/1989 |
| JP | S64-068582 | 3/1989 |
| JP | 01192538 | 8/1989 |
| JP | 01-266284 | 10/1989 |
| JP | 01-310947 | 12/1989 |
| JP | 02048076 | 2/1990 |
| JP | 04-126221 | 4/1992 |
| JP | 04-169297 | 6/1992 |
| JP | 5-201196 | 8/1993 |
| JP | 08-267625 | 10/1996 |
| JP | 11256484 | 9/1999 |
| JP | 2000263673 | 9/2000 |
| JP | 2001270019 | 10/2001 |
| KR | 20030063833 | 7/2003 |
| WO | WO 89/01829 | 3/1989 |
| WO | WO 90/09289 | 8/1990 |
| WO | WO 92/04502 | 3/1992 |
| WO | WO 93/12283 | 6/1993 |
| WO | WO 94/19530 | 9/1994 |
| WO | WO 97/34507 | 9/1997 |
| WO | WO 02/07959 | 1/2002 |
| WO | WO 02/09925 | 2/2002 |
| WO | WO 02/058854 | 8/2002 |
| WO | WO 03/031083 | 4/2003 |
| WO | WO 2004/005023 | 1/2004 |
| WO | WO 2004/005600 | 1/2004 |
| WO | WO 2005/035235 | 4/2005 |
| WO | WO 2005/118948 | 12/2005 |
| ZA | 88/6259 | 4/1990 |
| ZA | 92/2154 | 2/1993 |

OTHER PUBLICATIONS

Written Opinion for International (PCT) Patent Application No. PCT/US2006/029410, mailed Nov. 19, 2007.
International Preliminary Report on Patentability for International (PCT) Patent Application No. PCT/US2006/029410, mailed Jan. 29, 2008.
Declaration of Louis Brown Abrams under 37 CFR § 1.98, Jan. 11, 2008, for U.S. Appl. No. 11/460,519, 5 pages.
Declaration of Louis Brown Abrams under 37 CFR § 1.98, for U.S. Appl. No. 11/460,493, signed Jan. 11, 2008, 5 pages.
"Aeroshoes the microporous membrane for absorption and desorption"; AeroShoes; available at http://www.aeroshoes.com/flashon/product/default.htm; 1 page; undated.
"Celgard Announces New Products and New Customer"; May 2, 2005; 1 page.
"Flockin' to Precision"; Images Magazine; Feb. 1992, 1 page.
"Product Information" Celgard Inc.; available at http://www.celgard.com/products/product-information.cfm; 1 page; undated.
"RMIUG Meeting Minutes—Colorado in the Information Age"; Jan. 14, 1997; 1 page.
"Schaetti Fix Cross Linking Test Product"; Dynamic Coating Technology; Sep. 18, 2006; 4 pages.
"Fabric Processing Guidelines and Expected Product Attributes," Wellman, Inc., The Fibers Division (Jul. 25, 2001), 8 pages.
Artisyn Synthetic Paper Characteristics & Benefits, http://www.artisynpaper.com/index.cfm?fuseaction=Artisyn. Characteristics, printed Aug. 15, 2005, 2 pages.

Artisyn Synthetic Paper Handling & Storage, http://www.artisynpaper.com/index.cfm?fuseaction=Artisyn.Handling, printed Aug. 15, 2005, 2 pages.
Artisyn Synthetic Paper Printing Compatibility, http://www.artisynpaper.com/index.cfm?fuseaction=Artisyn.Printing, printed Aug. 15, 2005, 2 pages.
Artisyn Synthetic Paper Product Line, http://www.artisynpaper.com/index.cfm?fuseaction=Artisyn.Products, printed Aug. 15, 2005, 1 page.
Artisyn Synthetic Paper Product Overview, http://www.artisynpaper.com/index.cfm?fuseaction=Artisyn.Overview, printed Aug. 15, 2005, 2 page.
Artisyn® Synthetic Paper—Applications Commercial Printing, http://www.artisynpaper.com/index.cfm? fuseaction=Applications.CommercialPrinting, printed Aug. 15, 2005, 2 pages.
Artisyn® Synthetic Paper—Applications Laminated Cards, http://www.artisynpaper.com/index.cfm? fuseaction=Applications.LaminatedCards, printed Aug. 15, 2005, 2 page.
Artisyn® Synthetic Paper—Applications Pressure Sensitive, http://www.artisynpaper.com/index.cfm? fuseaction=Applications.PressureSensitive, printed Aug. 15, 2005, 2 page.
Artisyn® Synthetic Paper—Applications Tags & Labels, http://www.artisynpaper.com/index.cfm? fuseaction=Applications.TagsLabels, printed Aug. 15, 2005, 2 pages.
Bostik USA; "Automotive & Industrial Division: Web & Powder Adhesives" (2002), available at http://www.bostik.com/oem/web_adhesives.html, 2 pages.
Bostik USA; "Industrial Adhesives" (2001), 3 pages.
Bostik USA; Web & Powder Adhesives; 2000; 2 pgs.
Brown Abrams, "Flocking a Touch of Velour" ScreenPrinting (Apr. 1987).
Brown Abrams, "Part II: Flocking" ScreenPrinting (Jun. 1987).
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Lextra® MouseRug®; "About the Product" (Jan. 27, 1999), http://www.mouserug.com/mouserug/aboutmouserugs.html, 2 pages.
Lextra® MouseRug®; "Dimensions" (Jan, 27, 1999), http://www.mouserug.com/mouserug/dimensions.html,1 page.
Lextra® MouseRug®; "MouseRug Components" (Jan, 27, 1999), http://www.mouserug.com/mouserug/mousecomp.html, 1 page.
PPG Industries, Inc., "Teslin® Sheet and the Environment", http://www.ppg.com/chm_teslin/whatsteslin/environ.htm, printed Jul. 27, 2005, 2 pages.
Studt et al.; "Versatality on a roll: Thermoplastic adhesive films"; Collano; Oct. 2002; 8 pages.
Declaration of L. Brown Abrams Under 37 CFR § 1.98 for U.S. Appl. No. 09/735,721 dated Jan. 16, 2004, 2 pages.
Declaration of L. Brown Abrams under 37 CFR § 1.98 for U.S. Appl. No. 09/621,830 dated Jan. 7, 2003, 2 pages.
Declaration of L. Brown Abrams under 37 CFR § 1.98 for U.S. Appl. No, 10/394,357 dated January 16, 2004, 4 pages with Appendix A-I.
Declaration of L. Brown Abrams under 37 CFR 1.132 for U.S. Appl. No. 09/735,721dated Jan. 7, 2003.
Declaration of L. Brown Abrams under 37 CFR § 1.98 for U.S. Appl. No. 09/621,830 dated Jan. 16, 2004, 2 pages.
Declaration of L. Brown Abrams under 37 CFR § 1.98 for U.S. Appl. No. 10/394,357 dated Jan. 3, 2007, 4 pages with Appendix A-I.
Second Supplemental Declaration of L. Brown Abrams under 37 CFR § 1.132 for U.S. Appl. No. 09/548,839 executed Jan. 7, 2003.
Supplemental Declaration of L. Brown Abrams under 37 CFR § 1.132 for U.S. Appl. No. 09/548,839 executed Oct. 23, 2002.
"Polymers", Chemistry, Unit 16, date unknonwn, pp. 313-325.
"Bicomponent Fibers", available at http://web.utk.edu/~mse/pages/Textiles/Bicomponent%20fibers.htm, Updated Apr. 2004, 8 pages.
Bright, Larry. "Trouble Shooting Continuous Thermosol Dyeing of Polyester Fiber and Blends". American Dyestuff Reporter, Aug. 1996, pp. 60-61.
Protect-All Print Media, Inc., "Technical Information Artisyn® Synthetic Paper—Universal Grade", 5 pages. (undated).
Artisyn Synthetic Paper 165, Printability Product Specification Sheet, May 1997, 1 page.
Artisyn Synthetic Paper 165, Printability Product Specification Sheet, Mar. 1999, 2 pages.
PPG Industries, Inc., "Teslin® Synthetic Printing Sheet Technical Manual", 2000, 31 pages.
PPG Industries, Inc., "Teslin® Product Printing Technology Compatibility", 2000, 1 page.
Artisyn Synthetic Paper 165, Printability Product Specification Sheet, Dec. 2000, 2 pages.
Artisyn Synthetic Paper 165, Printability Product Specification Sheet, Mar. 2001, 2 pages.
Bayer Films Americas, "Makrofol® DPF 5072 Polycarbonate Film Development Product", Feb. 2004, 2 pages.
Bayer Films Americas, "New Product Release—Unique Polycarbonate-Based Film for Bright Metallic Look Applications", Jul. 26, 2004, 1 page.
Bayer Films Americas, Makrofol® and Bayfol® advertising circular, 2004, 12 pages.
PPG Industries, Inc., "What is Teslin® Sheet?", http://www.ppg.com/chm_teslin/whatsteslin/whatis.htm, printed Jul. 27, 2005, 2 pages.
PPG Industries, Inc., "Grades of Teslin® Sheet", http://www.ppg.com/chm_teslin/whatsteslin/grades.htm, printed Jul. 27, 2005, 2 pages.
PPG Industries, Inc., "Weights and Sizes of Teslin® Sheet", http://www.ppg.com/chm_teslin/whatsteslin/weights.htm, printed Jul. 27, 2005, 2 pages.
PPG Industries, Inc., "General Characteristics", http://www.ppg.com/chm_teslin/whatsteslin/gen.htm, printed Jul. 27, 2005, 2 pages.
PPG Industries, Inc., "Properties of Teslin®", http://www.ppg.com/chm_teslin/whatsteslin/properties.htm, printed Jul. 27, 2005, 2 pages.
PPG Industries, Inc., "Handling & Storage", http://www.ppg.com/chm_teslin/whatsteslin/hand.htm, printed Jul. 27, 2005, 2 pages.
PPG Industries, Inc., "Laminated Card Production", http://www.ppg.com/chm_teslin/whatsteslin/lam.htm, printed Jul. 27, 2005, 2 pages.
PPG Industries, Inc., "Printing on Teslin® Sheet", http://www.ppg.com/chm_teslin/whatsteslin/print.htm, printed Jul. 27, 2005, 2 pages.
PPG Industries, Inc., "Finishing Techniques for Teslin® Sheet", http://www.ppg.com/chm_teslin/whatsteslin/fin.htm, printed Jul. 27, 2005, 5 pages.
PPG Industries, Inc., "Chemical Compatibility of Teslin® Sheet", http://www.ppg.com/chm_teslin/whatsteslin/chem.htm, printed Jul. 27, 2005, 3 pages.
"Artisyn® Synthetic Paper—Applications In-Mold Graphics", http://www.artisynpaper.com/index.cfm?fuseaction=Applications.InMoldGraphics, printed Aug. 15, 2005, 1 page.
"Artisyn® Synthetic Paper—Typical Properties", http://www.artisynpaper.com/index.cfm?fuseaction=Properties.Typical, printed Aug. 15, 2005, 2 pages.
U.S. Appl. No. 09/621,830, filed Jul. 24, 2000, Abrams.
Abrams, Louis Brown, "Flocked Articles Having a Woven Graphic Design Insert and Methods of Making the Same" U.S. Appl. No. 12/397,946, filed Mar. 4, 2009.
Abrams, Louis Brown, "Flocked Slurried Thermosetting Adhesive Article" U.S. Appl. No. 11/957,205, filed Dec. 14, 2007.
Abrams, Louis Brown, "Co-Molded Direct Flock and Flock Transfer and Methods of Making Same" U.S. Appl. No. 11/972,440, filed Jan. 10, 2008.
Abrams, Louis Brown, "Co-Molded Direct Flock and Flock Transfer and Methods of Making Same" U.S. Appl. No. 12/013,996, filed Jan. 14, 2008.

Abrams, Louis, Brown, "Sublimation Dye Printed Textile" U.S. Appl. No. 12/031,445, filed Feb. 14, 2008.

Abrams, Louis Brown, "Computer Mouse Pad Fabricated From Patterned Flock" U.S. Appl. No. 29/058,551, filed Aug. 19, 1996.

Abrams, Louis Brown, "Computer Mouse Pad Fabricated From Patterned Flock or Pile Fibers and Method of Fabrication" U.S. Appl. No. 09/548,839, filed Apr. 13, 2000.

Abrams, Louis Brown, "Flocked Elastomeric Articles" U.S. Appl. No. 11/533,699, filed Sep. 20, 2006.

Abrams, Louis Brown, "Flocked Adhesive Article" U.S. Appl. No. 11/560,679, filed Nov. 16, 2006.

Abrams, Louis Brown, "Flocked Multi-Colored Adhesive Article With Bright Lustered Flock" U.S. Appl. No. 11/565,974, filed Dec. 1, 2006.

PPG Industries, Inc., "Teslin® Sheet and the Environment", http://www.ppg.com/chm_teslin/whatsteslin/environ.htm, printed Jul. 27, 2005, 2 pages.

"Artisyn Synthetic Paper Product Overview", http://www.artisynpaper.com/index.cfm?fuseaction=Artisyn.Overview, printed Aug. 15, 2005, 2 pages.

"Artisyn Synthetic Paper Characteristics & Benefits", http://www.artisynpaper.com/index.cfm?fuseaction=Artisyn.Characteristics, printed Aug. 15, 2005, 2 pages.

"Artisyn Synthetic Paper Product Line", http://www.artisynpaper.com/index.cfm?fuseaction=Artisyn.Products, printed Aug. 15, 2005, 1 page.

"Artisyn Synthetic Paper Printing Compatibility", http://www.artisynpaper.com/index.cfm?fuseaction=Artisyn.Printing, printed Aug. 15, 2005, 2 pages.

"Artisyn Synthetic Paper Handling & Storage", http://www.artisynpaper.com/index.cfm?fuseaction=Artisyn.Handling, printed Aug. 15, 2005, 2 pages.

"Artisyn® Synthetic Paper—Applications Laminated Cards", http://www.artisynpaper.com/index.cfm?fuseaction=Applications.LaminatedCards, printed Aug. 15, 2005, 2 pages.

"Artisyn® Synthetic Paper—Applications Commercial Printing", http://www.artisynpaper.com/index.cfm?fuseaction=Applications.CommercialPrinting, printed Aug. 15, 2005, 2 pages.

"Artisyn® Synthetic Paper—Applications Tags & Labels", http://www.artisynpaper.com/index.cfm?fuseaction=Applications.TagsLabels, printed Aug. 15, 2005, 2 pages.

"Artisyn® Synthetic Paper—Applications Pressure Sensitive", http://www.artisynpaper.com/index.cfm?fuseaction=Applications.PressureSensitive, printed Aug. 15, 2005, 2 pages.

U.S. Appl. No. 12/580,120, filed Oct. 15, 2009, Abrams.
U.S. Appl. No. 12/624,254, filed Nov. 23, 2009, Abrams.
U.S. Appl. No. 12/636,421, filed Dec. 11, 2009, Abrams.
U.S. Appl. No. 12/612,524, filed Nov. 4, 2009, Abrams.
U.S. Appl. No. 12/706,622, filed Feb. 16, 2010, Abrams.

"PolyOne—OnFlexTM-S EH Economy Grades (High Density)", PolyOne® Corporation 2007, pp. 1-2.

"PolyOne—OnFlexTM-S EL Economy Grades (Low Density)", PolyOne® Corporation 2007, pp. 1-2.

"PolyOne—OnFlexTM-S FG Food Contact Grades", PolyOne® Corporation 2007, pp. 1-2.

"PolyOne—OnFlexTM-S KE Grades for 2K Moulding on Engineered Thermoplastics", PolyOne® Corporation 2007, pp. 1-2.

"PolyOne—OnFlexTM-S Thermoplastic Elastomer Compounds", PolyOne® Corporation 2007, pp. 1-6.

"PolyOne—Synprene RT-3750", PolyOne® Corporation Feb. 9, 2010, 1 page.

"PolyOne—OnFlex™—S Styrenic Thermoplastic Elastomers", printed Feb. 9, 2010, 2 pages.

"PolyOne—Synprene RT-3790", PolyOne® Corporation Feb. 9, 2010, 1 page.

"PolyOne—Synprene RT-3850MS", PolyOne® Corporation Feb. 9, 2010, 1 page.

"PolyOne—Synprene RT-3870M", PolyOne® Corporation Feb. 9, 2010, 1 page.

"PolyOne—Synprene RT-3770", PolyOne® Corporation Feb. 9, 2010, 1 page.

"Versaflex® OM Series Material Review", TPE Tips, Issue 5, GLS Corporation Rev. Jan. 12, 2007, 2 pages.

"Versaflex® OM 3060-1—Technical Data Sheet", GLS Corporation, available at http://glscorporation.com/gls2/print.jsp?productID=182, Feb. 9, 2010, 2 pages.

* cited by examiner

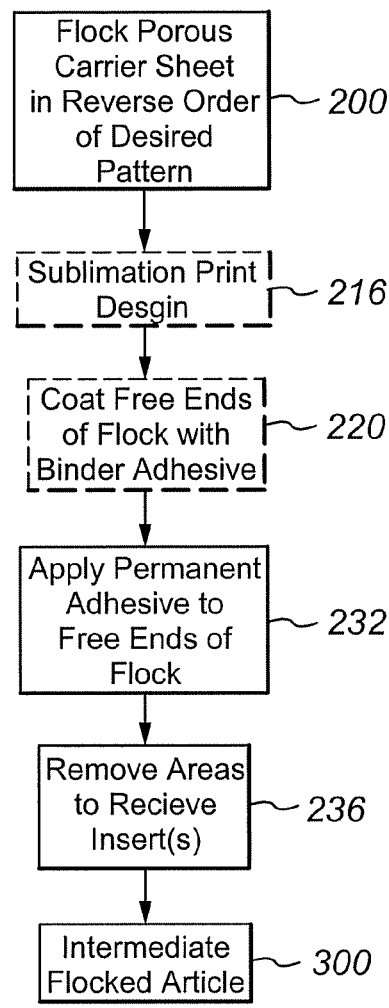
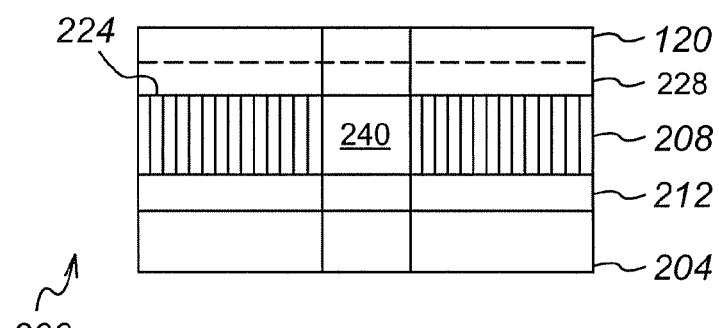
Fig. 2
Fig. 3

FLOCKED ARTICLES HAVING NONCOMPATIBLE INSERT AND POROUS FILM

CROSS REFERENCE TO RELATED APPLICATION

The present application claims the benefits, under 35 U.S.C.§119(e), of U.S. Provisional Application Ser. Nos. 60/703,925, filed Jul. 28, 2005, entitled "Flocked Design with Three Dimensional Metallic Insert"; 60/704,681, filed Aug. 1, 2005, of the same title; 60/707,577, filed Aug. 11, 2005, of the same title; 60/710,368, filed Aug. 22, 2005, of the same title; 60/716,869, filed Sep. 13, 2005, of the same title; 60/719,469, filed Sep. 21, 2005, of the same title; 60/779,317, filed Mar. 3, 2006, of the same title; and 60/786,528, filed Mar. 27, 2006, of the same title; each of which is incorporated herein by this reference.

FIELD

The invention relates generally to flocked articles and particularly to flocked graphics.

BACKGROUND

Flocked articles are used in a wide variety of applications. Flocked articles are being used for textile decoration as well as molded articles. Flock is a short precision cut or pulverized natural or synthetic fiber used to produce a velvet like coating on cloth, rubber, film, or paper. Flock generally has a length between about 0.010 to 0.250 inches (0.25 mm to 6.25 mm).

In these applications, it has been highly desired to have multi-media flocked articles including a material having a metallic sheen or luster. Metal noncompatible inserts have been used in the prior art but the metal inserts have rapidly faded due to ultraviolet light exposure, wear, and/or the effects of repeated washings. It is therefore desirable to have a multi-media flocked article having a noncompatible insert that resists fading.

SUMMARY

These and other needs are addressed by the various embodiments and configurations of the present invention. The present invention is directed to flocked articles and graphics comprising a compatible and/or noncompatible (or incompatible) material, such as a metallized film. As used herein, a "metallized film" refers to any material, whether metal or a nonmetal, having a metal-like appearance (e.g., metal-like sheen or luster).

In one embodiment of the present invention, a metallized film is used to provide a number of highly attractive colors, sheens and matte finishes. In one configuration, the metallized film is metallic in appearance. In one configuration, it contains a metal layer vapor deposited on a first polymeric film with a second polymeric film being located on the opposing side of the metal layer. The metal layer is sandwiched between the first and second polymeric layers by means of a laminate adhesive. The polymeric layers can be UV-resistant, water resistant, thermally stable, and otherwise designed to resist wear and deterioration. Preferably, the polymeric layers are a polycarbonate. Thus, unlike conventional metal-containing noncompatible inserts water discoloration of the insert is typically not a problem. This can obviate the need to apply additional protective layers to the insert to protect any metal from oxidation.

The metallized film can have a highly desirable mirror-like metallic look from the metallized layer, a high abrasion resistance of the sandwiching polymeric films to protect the metal and laminate adhesive from fading, discoloration, and/or corrosion, and a high ability to accept and adhere to a wide variety of hot melt thermoplastic or thermoset adhesives, whether in the form of a liquid, power, or preformed film.

The flocked article can include a porous film to act as a binder or tie material for the otherwise incompatible or weakly compatible materials, namely the flock and the metallized film. The porous film can bond well to a number of otherwise compatible and noncompatible materials on opposite sides, thus serving well as a so-called "tie coat" layer. For example, the film bonds to a variety of adhesives as noted above. The adhesives can be applied as a thermoplastic powder, a self-supporting heat-activated film, or as a liquid coating. In particular, the film may be readily laminated to preformed, self-supporting films of thermoset and/or thermoplastic adhesive(s)s, including hot melt adhesive(s).

The porous film, though having modest tensile strength when taken alone, can experience substantial improvements in tensile strength when combined with one or more other materials. For example, the film, by itself, lacks the strength of conventional paper carriers and therefore would at first blush appear to be a poor candidate for use in a machine (web) based-process and in products that need to be durable. However, when coated with water or solvent-based release adhesives the release adhesives not only provide an adhesive surface to capture and hold flock fibers but also provides a substantial improvement in film strength after the adhesive is dried and cured. While not wishing to be bound by any theory, it is believed that the release adhesive is carried into the film matrix by the combined effects of the film's porosity and permeability and, after drying, substantially fills the pores in the film to provide the desired strength enhancement. The synergistic effect of the release adhesive and the porosity/permeability of the film makes the porous film strong enough to withstand the forces applied during subsequent processing stages, such as web-type tensile forces, vacuum cleaning, mechanical brushing, baking, and heat transfer application processes (e.g., heat pressing, cooling, pulling the carrier, and releasing the fibers). Additional support film(s) may nonetheless be added to the side of the porous film opposite the side containing the flock to provide further support.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 2 is a block diagram of a process embodiment to make an intermediate flocked article for use in the three dimensional design;

FIG. 3 is a cross section of an intermediate flocked article;

DETAILED DESCRIPTION

Figure 1:
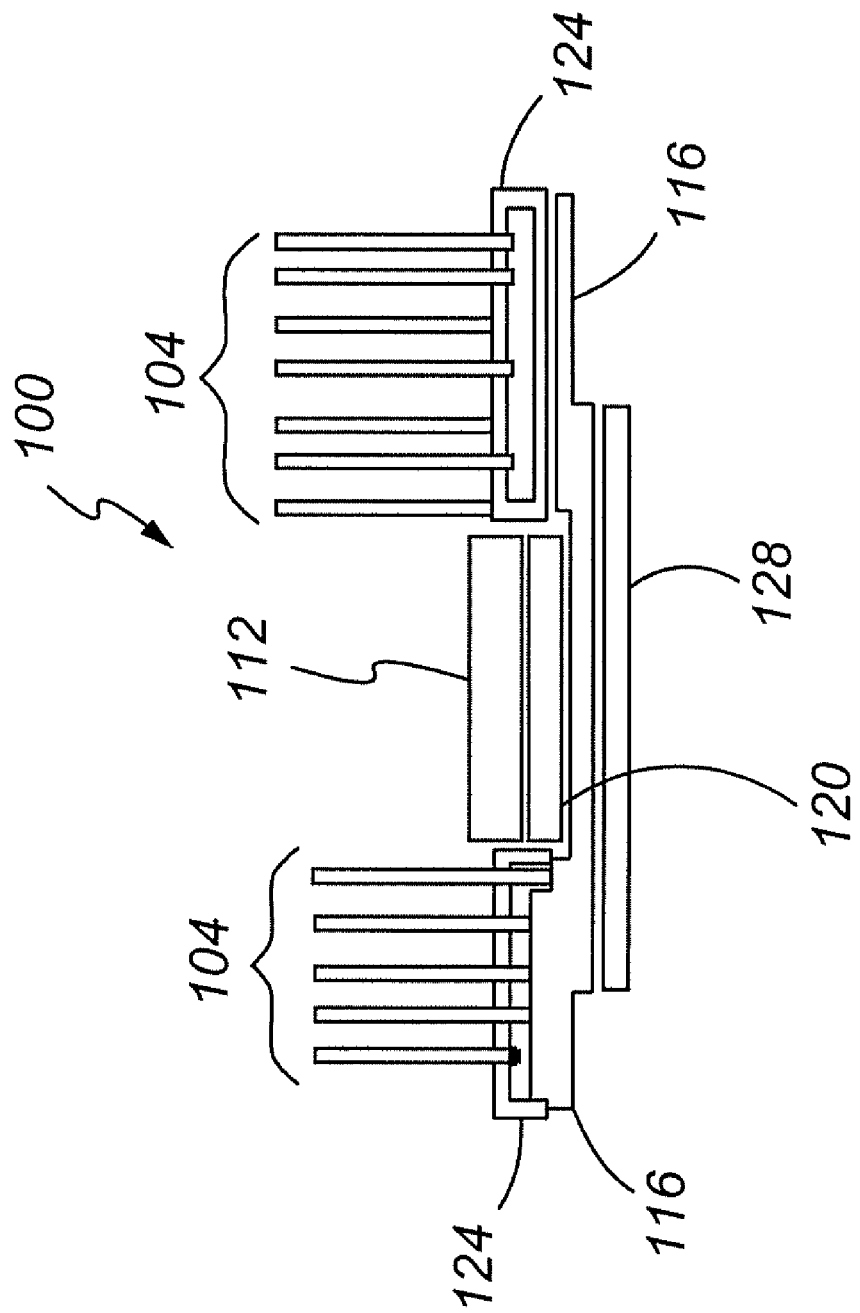
FIG. 1 is a cross section of a three dimensional design according to an embodiment of the present invention.
Figure 9:
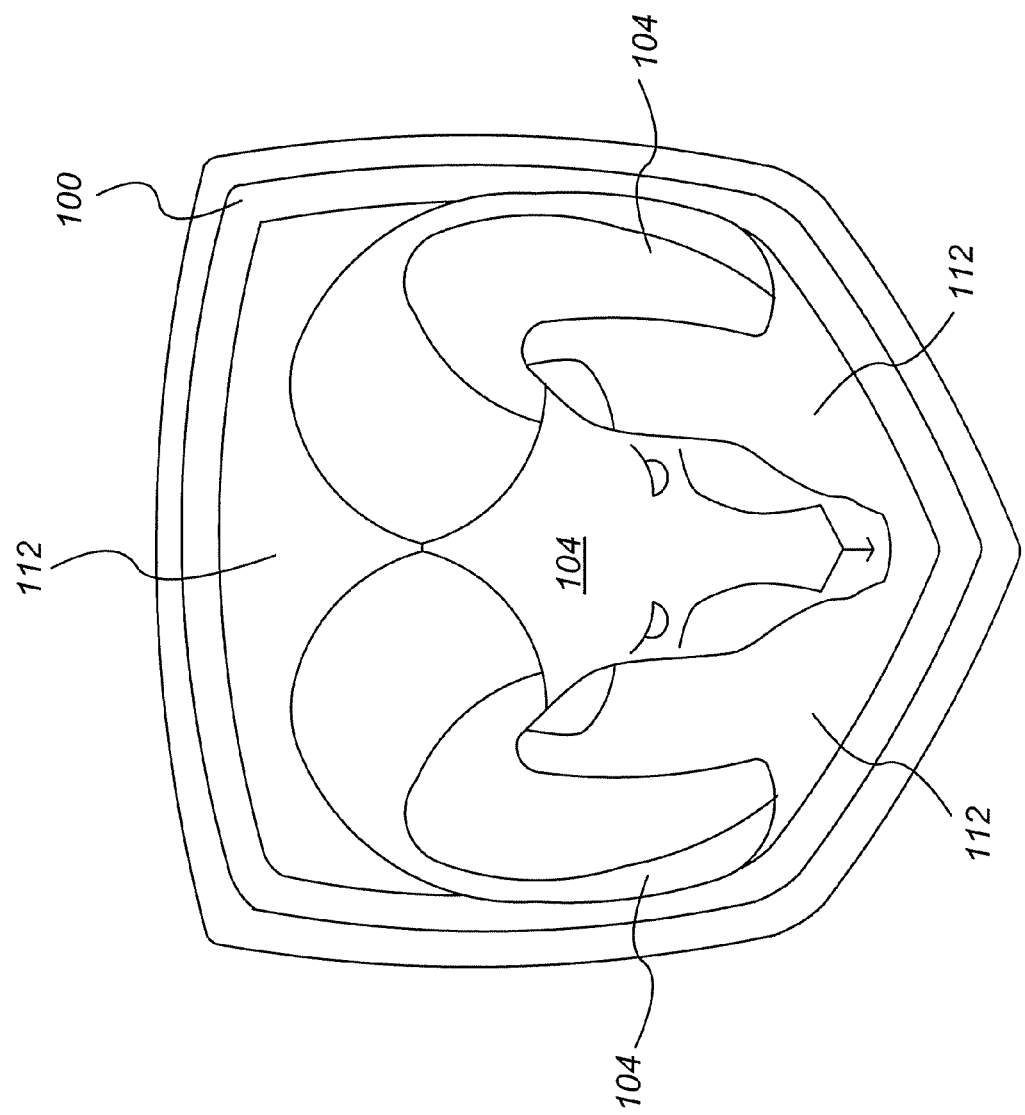
FIG. 9 is an exemplary decorative media according to an embodiment of the present invention.

FIGS. 1 and 9 show a three-dimensional design according to an embodiment of the present invention. The design 100 includes (multi-colored or sublimation printed) flocked areas 104 surrounding a plurality of compatible or noncompatible inserts 112. The inserts 112 are adhered to a porous film 116 by a first adhesive 120. Additionally, the porous film 116 is adhered to the flock areas 104 by a flock (second) adhesive 124. Finally, the design 100 is adhered to a desired substrate, such as a textile, by a permanent (third) adhesive 128.

The inserts 112 can be any design media, such as glass beads. In a preferred embodiment, the inserts 112 are formed from one or more polymeric light diffusing films, such as polycarbonate and/or polyester light diffusion films sold under the tradenames Makrofol™ and/or Bayfol™. The films are preferably metal-containing and have a first and/or second surface gloss (60° angle with black inked second surface) of at least about 50 gloss units, more preferably of at least about 75 gloss units, and even more preferably of at least about 75 gloss units, first and/or second surface roughnesses (R3Z) of no more than about 20 microns, more preferably of no more than about 3 microns, and even more preferably of no more than about 1 micron, and a luminous transmittance of no more than about 50%, more preferably no more than about 5%, and even more preferably no more than about 1%. The insert 112 preferably has a metallic or nonmetallic sheen and a gloss/fine matte and a thickness of no more than about 0.5 inches, more preferably of no more than about 0.25 inches, and even more preferably of no more than about 0.20 inches. A particularly preferred insert is Makrofol™ DPF 5072™.

The porous film 116 is preferably a microporous material that includes a matrix of substantially water insoluble thermoplastic organic polymer, finely divided substantially water-insoluble filler particles and a network of interconnected pores communicating substantially throughout the microporous material. The filler particles are distributed throughout the matrix and constitute from about 40 to about 90 percent by weight of the microporous material. The filler particles are a metal oxide, such as alumina, silica, and titania with silica being preferred. Preferably, at least 50 percent by weight of the particles are amorphous precipitated silica particles. The particles have a preferred maximum dimension of less than about 5 micrometers, more preferably no more than about 1 micrometer, even more preferably no more than about 0.1 micrometers, and even more preferably no more than about 0.05 micrometers and a preferred average pore size of less than 1 micrometer and more preferably of no more than about 0.1 micrometer. The pores preferably constitute from about 35 to about 95 percent by volume of the microporous material. The matrix of the microporous material includes a water-insoluble thermoplastic organic polymer. Examples of suitable polymers include polyolefins, poly(halo-substituted olefins), polyesters, polyethylenes, polyamides, polyurethanes, polyureas, poly(vinyl halides), poly(vinylidene halides), polystyrenes, poly(vinyl esters), polycarbonates, polyethers, polysulfides, polyimides, polysilanes, polysiloxanes, polycaprolactones, polyacrylates, and polymethylacrylates, with poly(vinyl chloride), copolymers of vinyl chloride, and mixtures thereof being preferred. The material may further include plasticizers, lubricants, and antioxidants.

The microporous material is preferably coated with a substantially nonporous coating composition including a volatile liquid medium (e.g., water and/or a nonaqueous solvent) and binder dissolved or dispersed in the medium. The binder includes a film-forming organic polymer, preferably including (a) water-soluble poly(ethylene oxide) having a preferred weight average molecular weight in the range of from about 100,000 to 3,000,000 and (b) water-soluble or water-dispersible crosslinkable urethane-acrylate hybrid polymer. In addition to or in lieu of poly (ethylene oxide), the organic polymer may further include additional organic polymers such as water-soluble cellulosic organic polymers, water-soluble noncellulosic organic polymers, and/or water dispersible polymers such as poly(ethylene-co-acrylic acid), poly(ethylene),and poly(ethylene oxide). The poly(ethylene oxide) includes copolymers of ethylene oxide with lower alkylene oxide and homopolymers of ethylene oxide. Preferably, the organic polymer component of the coating includes from about 20 to about 80% by weight of the urethane-acrylate hybrid polymer. The coating may further include surfactants and adjuvant materials. After drying and crosslinking, the peel strength between the coating and microporous material substrate is high.

The film has a preferred puncture strength of greater than about 300 g/25.4 μm, a preferred tensile strength of less than about 2% at 1000 psi, and a preferred thermal ability of less than about 5% shrinkage after 160 minutes at 90° C.

A preferred porous film is further discussed in U.S. Pat. No. 6,025,068, which is incorporated herein by this reference. A particularly preferred porous film is sold by PPG Industries Inc. under the tradename Teslin™. Battery separator membranes can also be used. Examples include Daramic Industrial CL™ sold by Daramic, Inc., and the battery separator membranes sold by Celgard, or by Daramic, Inc. under the tradename Artisyn™. Artisyn™ is an uncoated, mono-layer, highly filled polyolefin sheet.

The flock fibers in the flock layer 1104 can be any desirable material, whether natural or synthetic. Preferably, the flock is composed of polyester (such as poly(ethylene terephthalate) and poly(cyclohexylene-dimethylene terephthalate)), vinyl, nylon, rayon, and the like.

The various permanent adhesives 1108, 1116, and 1120 can be any suitable adhesive, with water- and solvent-based adhesives and preformed film adhesives being preferred. Preferred permanent adhesives include thermoset and hot melt thermoplastic adhesives, whether as a liquid, powder, or (preformed) self-supporting film. As will be appreciated, thermoset adhesives solidify, activate and/or set irreversibly when heated above a certain temperature. This property is usually associated with a cross-linking reaction of the molecular constituents induced by heat or radiation. Thermoset adhesives can include curing agents such as organic peroxides, isocyanates, or sulfur. Examples of thermoplastic and thermosetting adhesives include polyethylene, phenolics, alkyds, acrylics, amino resins, polyesters, epoxides, polyurethanes, polyamides, and silicones.

The adhesives 1108, 1116, and 1200 may contain additives, such as fillers, catalysts, colorants (dyes or pigments) and optical blocking/reflective/absorbtive materials. The preferred porous film, namely Teslin™ and Artisyn™, can be highly sensitive to Ultraviolet (UV) radiation and can degrade rapidly when exposed to direct sunlight. Accordingly, the adhesives may contain light blocking, absorbing, and/or reflecting materials to decrease substantially the optical transmissivity of the adhesive. Preferably, the adhesive, when on the light contacting side of the porous film, blocks at least about 75%, more preferably at least about 85%, and even more preferably at least about 95% of the UV radiation spectrum. Such optical blocking/reflecting/absorbing materials are known to those of skill in the art.

Referring to FIGS. 1-6 and 9, a first process embodiment to manufacture the three dimensional design 100 will now be described. It is to be appreciated that those of ordinary skill in the art will envision other methods of manufacturing the design 100. Such other methods are considered to be a part of the present invention.

With reference to FIG. 2, the steps to produce an intermediate flocked article 300 will now be described.

In step 200 a carrier sheet 204 is flocked with flock fibers 208 in the reverse order of the desired pattern. The carrier sheet can be any substrate that is dimensionally stable under the conditions of temperature and pressure encountered during the process. The carrier sheet 204 is preferably a porous film, such as the porous film 116 described above, coated with a release adhesive 212, which is preferably water-based. Typically (but not always), the carrier is a discontinuous sheet as opposed to a continuous sheet on a running web line.

The release adhesive 212 can be any adhesive that adheres more strongly to the carrier sheet than the flock fibers but adheres to both enough to hold them together. For example, the release adhesive 212 can be any temporary adhesive, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, silicone, or compositions containing two or more of these ingredients.

It is desired that, when the flock fibers are removed from the release adhesive, the fibers are substantially free of release adhesive. The release adhesive may be applied in the form of a solution or emulsion. The release adhesive may be applied on the carrier in the perimeter shape of the desired design or without regard to the overall design desired. The release adhesive may be applied by any suitable technique such as, for example, by applying the release adhesive with rollers or spraying the release adhesive.

In optional step 216, the exposed ends 224 of the flocked surface are sublimation printed to provide the desired design on the flock. Sublimation printing is described in copending U.S. applications Ser. Nos. 10/614,340, filed Jul. 3, 2003; Ser. No. 11/139,439, filed May 26, 2005; and Ser. No. 11/036,887, filed Jan. 14, 2005, to Abrams, each of which is incorporated herein by this reference. As will be appreciated, common ways of performing sublimation ink direct printing include inkjet or screen sublimation ink printing and sublimation transfer printing using devices such as an inkjet dye sub printer, a ribbon-based dye sub printer, a hybrid sublimation printer, and a small dye sub ribbon-based printer. In inkjet (direct) sublimation ink printing, a special heat sensitive dye is used in a computer-controlled printer, such as an HP 550™, or Mimaki JV4™ to sublimation print the ink onto the flock fibers through vapor phase transportation of the ink from the printer to the flock fibers. The transferred dye is then heat and pressure thermofixed and thereby enters the amorphous areas of the fiber matrix. As noted, vacuuming of the flock can be conducted preferably before or after sublimation ink printing. Commonly, the color must go all the way down the fiber.

In optional step 220, the free ends 224 of the flock are coated with a binder adhesive 228. This process is discussed in U.S. Pat. Nos. 4,810,549; 5,207,851; 5,597,637; 5,858,156; 6,010,764; 6,083,332; and 6,110,560, which are incorporated herein by this reference. A suitable binder adhesive is a water based acrylic which binds the flock together as a unit. The binder adhesive 228 adhesive may contain a hot melt adhesive.

In step 232, the permanent (second) adhesive 124 is contacted with the free ends 224 of the flock 208 (or with the binder adhesive 228 depending on the process configuration employed). In one configuration, the second adhesive 124 is a thermoplastic or thermoset adhesive and is heated to a temperature sufficient to adhere the adhesive 124 to the flock 208. For a thermoset adhesive, the temperature is below the temperature at which the adhesive cross-links and is no longer reversible.

In step 236, areas of the assembly are removed to form voids 240 to receive the inserts 112 will be appreciated, the sizes of the areas removed are approximately the same size as the size of the corresponding insert 112. The void 240 passes completely through the assembly. In other words, the void 240 is free of adhesives 120, 224, and 212, the carrier sheet 204, and flock 208.

The process yields the intermediate flocked article 300 shown in FIG. 3.

Figure 4:
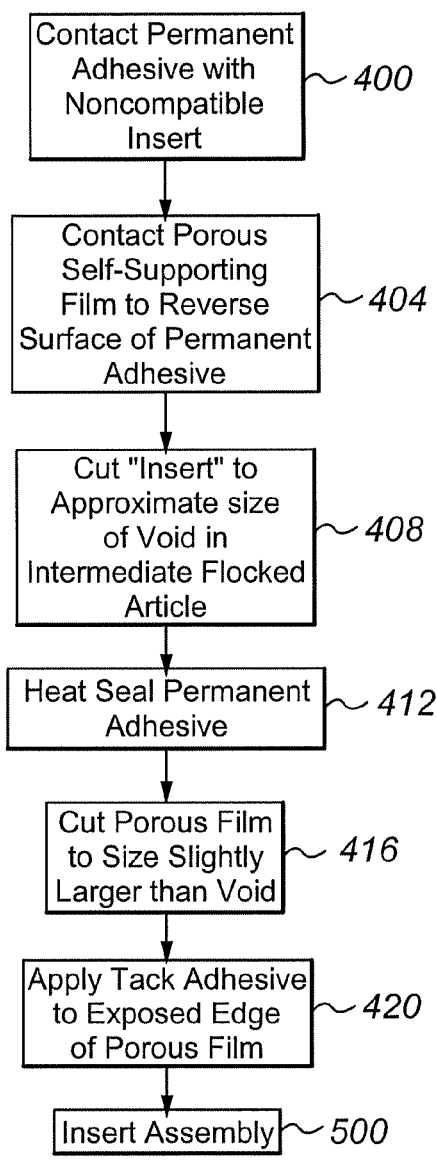
FIG. 4 is a block diagram of a process embodiment to make an insert assembly for use in the three dimensional design.

With reference to FIG. 4, the steps to produce the insert 112 will now be described.

In step 400, the first permanent adhesive 120 is contacted with the noncompatible insert 112.

In step 404, the upper surface of the porous film 116 (of which the lower surface has previously been contacted with the third permanent adhesive 128) is contacted with the first permanent adhesive 120.

In step 408, the insert 112 and first permanent adhesive 120 are cut to the size and shape of the void 240 in the intermediate flocked article 300. Cutting may be made by known techniques, such as a laser or a mechanical cutting device.

In step 412, the first (and third) permanent adhesives 120 and 128 are heat sealed. Heat sealing preferably occurs at a temperature within the thermoplastic behavior regime. Thus, when the permanent adhesive is a thermoset adhesive, the adhesive following step 412 is not thermoset As will be appreciated, steps 404, 408, and 412 may be performed in any order. For example, step 408 may be performed before step 404. Steps 400, 404, and 412 can be performed simultaneously, such as by lamination.

In step 416, the porous film, which was not cut in step 408, is cut to a size slightly larger than the void 240. This oversize relative to the void size is shown in FIG. 1. The overlapping edge of the porous film is used to secure the insert to the intermediate flocked article.

Figure 5:
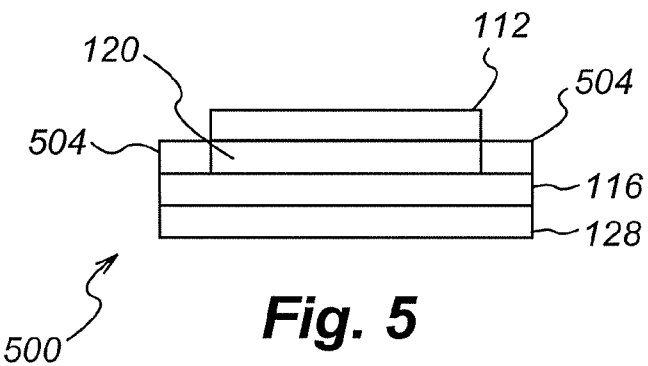
FIG. 5 is a cross section of an insert assembly.

In step 420, a tack adhesive 504 is applied to the overlapping edge of the porous film to provide the insert assembly 500 depicted in FIG. 5.

Figure 6:
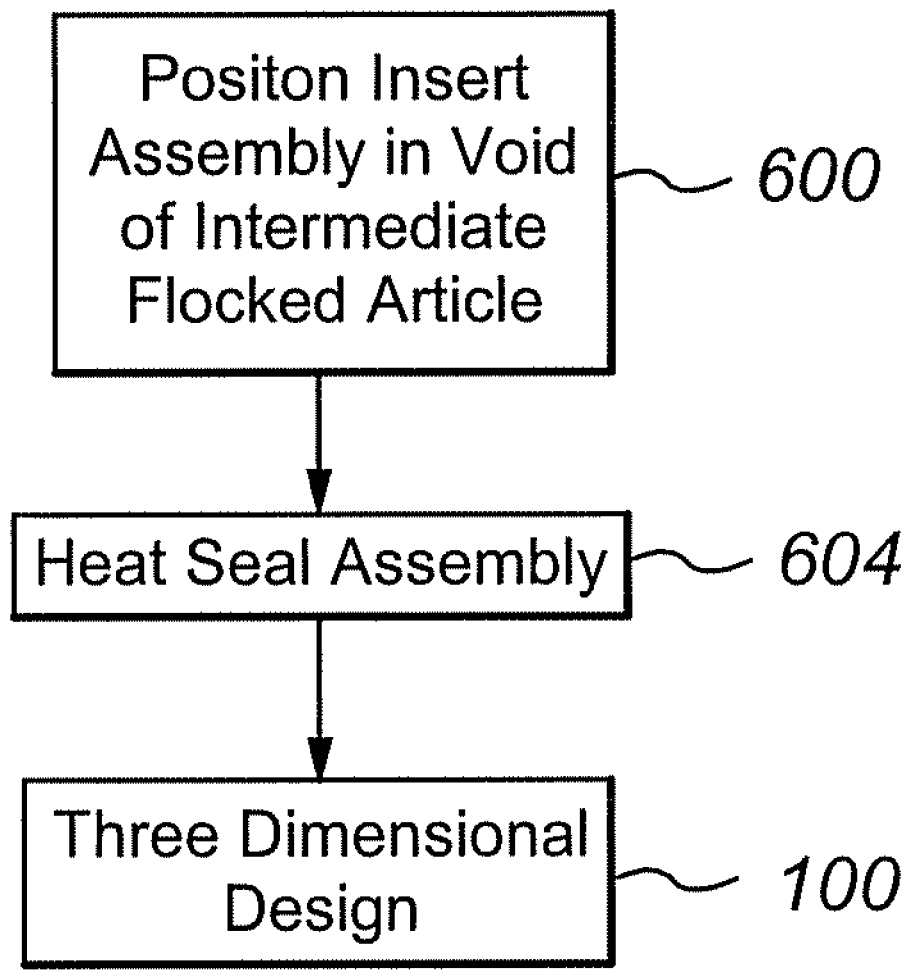
FIG. 6 is a block diagram of a process embodiment to make the three dimensional design.

FIG. 6 depicts the final steps of the process to form the three dimensional design 100.

In step 600, the insert 112 is positioned in the void 240 as shown in FIG. 1. The tack adhesive 504 temporarily holds the insert assembly 500 in position.

In step 604, the consolidated assembly formed from the insert assembly 500 and intermediate flocked article 300 is heat sealed to thermoplastically (and reversibly) set the second adhesive 124 and permanently adhere the porous film 116 to the flocked article 300.

The final three dimensional design 100 is shown in FIG. 1.

Figure 7:
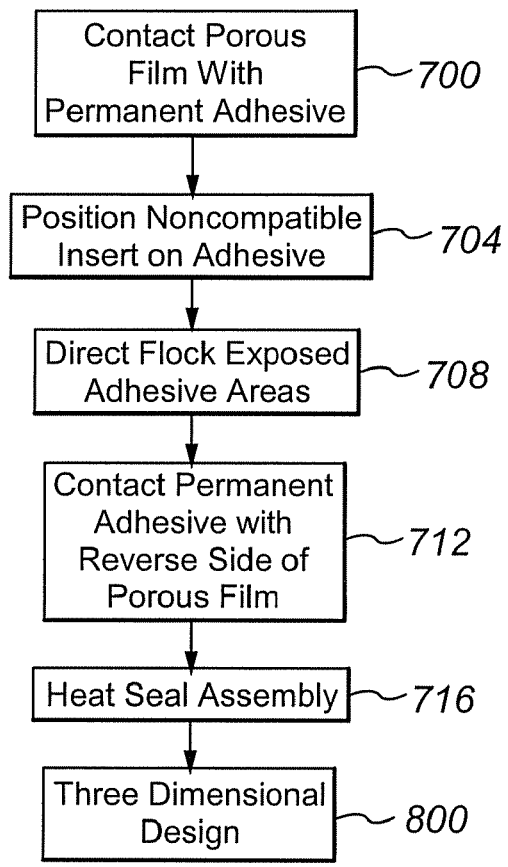
FIG. 7 is a block diagram of a process embodiment to make a three dimensional design according to another embodiment.
Figure 8:
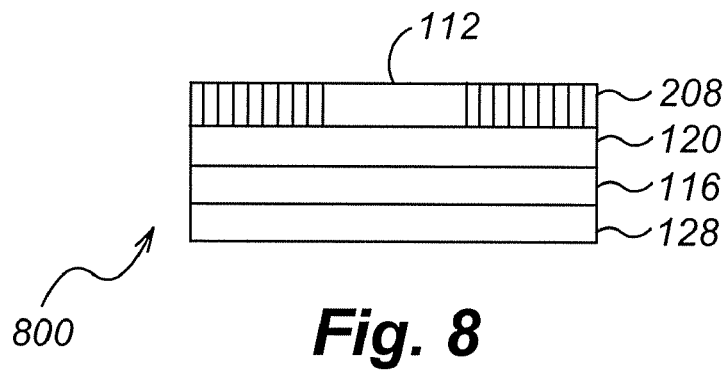
FIG. 8 is a cross section of the three dimensional design.

Another process embodiment to form a three dimensional design is depicted in FIGS. 7 and 8. The design 800 includes the flock 208, insert 112, porous film 116, and first and third adhesives 120 and 128.

In step 700, the porous film 116 is contacted with the first (and optionally third) permanent adhesives 120 and 128.

In step 704, the incompatible insert 112 is positioned on the first permanent adhesive 120.

In step 708, the exposed portions of the first permanent adhesive 120 are direct flocked by known techniques. Preferably, direct flocking is performed electrostatically by imparting a charge to the flock fibers and using an electric field to deposit the flock fibers on the oppositely charged substrate. The insert 112 acts as a mask and prevents flock fibers from being deposited in the area(s) to be occupied by inserts 112.

In optional step 712, the third permanent adhesive 128, if not already applied to the reverse side of the porous film 116, is now contacted with that side.

In step 716, the assembly is heated sealed to thermoplastically set the first and third adhesives. Following heat sealing or curing of the adhesive layers, which is typically performed using radiation (e.g., heat or light), the flocked surface can be vacuumed to remove loose flock fibers.

The final three dimensional design 800 is depicted in FIG. 8.

Figure 10:
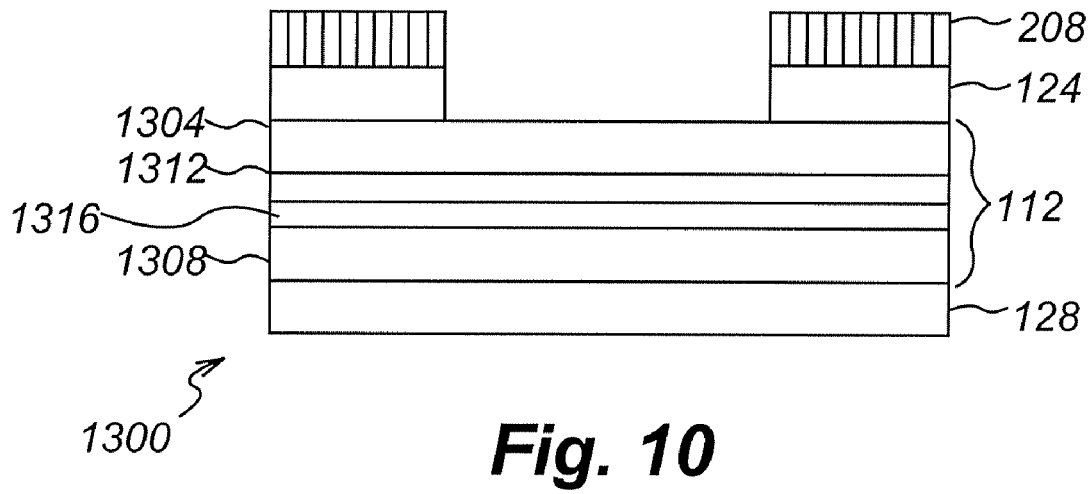
FIG. 10 is a cross section of another embodiment of a three dimensional design in accordance with the present invention.
Figure 11:
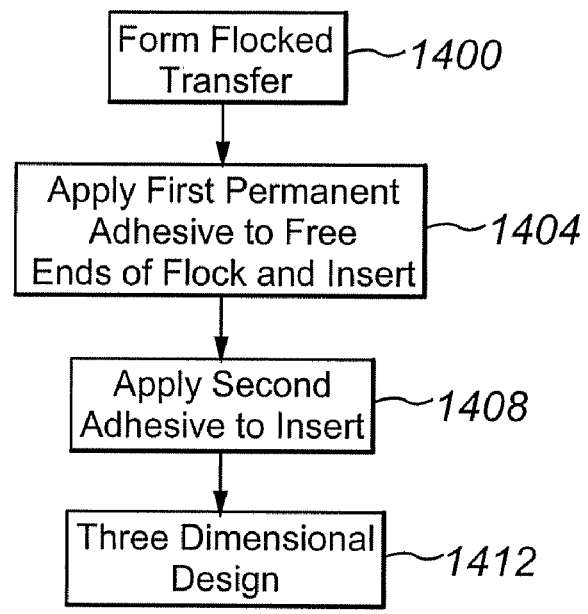
FIG. 11 is a block diagram of a process to make the three dimensional design of FIG. 10.

Another process embodiment to form a three dimensional design is depicted in FIGS. 10 and 11. The design 1300 includes the flock 208, insert 112, and first and second permanent adhesives 124 and 128. The first permanent adhesive 124 is preferably a thermoset adhesive, and the second permanent adhesive 128 is a thermoplastic hot melt adhesive.

The insert 112 components are also shown in FIG. 10. The insert 112 comprises first and second polymer films 1304 and 1308 (which are preferably polycarbonate films) sandwiching a metal film 1312 and laminate adhesive 1316. The insert 112 is formed by depositing the metal film 1312, such as by vapor deposition techniques, on the first polymer film 1304, followed by contacting the metal film or second polymer film 1308 with the laminate adhesive 1316, and finally laminating the first and second polymer films, metal film, and laminate adhesive together. To created desired metal appearances, the first or second polymer film can be colored, using suitable dyes or pigments or other colorants. Metal shades can be thus produced, such as brass, copper, and the like.

As a result of the properties of the adhesive, the insert is able to withstand exposure to temperature extremes and water, including washing and heat pressing. Other metallized films and/or laminates will let the metal layer begin to corrode (e.g., from the combined effects of water and detergent) from the outside edges where it is exposed and the corrosion progresses into the laminate, which delaminates the two films at the metal layer.

In other configurations, the first permanent adhesive is a composite of a thermoset adhesive contacting the flock and a thermoplastic adhesive contacting the insert. The thermoplastic adhesive is preferably a hot melt adhesive FIG. 11 shows the process to manufacture the product of FIG. 10.

In step 1400, a flocked transfer, comprising a porous film, water-based release adhesive, and flock, is formed by electrostatic flocking techniques.

In step 1404, the free ends of the flock in the flock transfer are contacted with the first permanent adhesive and insert. The first permanent adhesive is heated to adhere to the flock. Preferably, the first permanent adhesive is thermoset in this step. This step may be performed by any technique, with lamination techniques being preferred. A preferred technique is discussed in copending U.S. application Ser. Nos. 09/621,830, filed Jul. 24, 2000; Ser. No. 10/455,541, filed Jun. 4, 2003; and Ser. No. 10/670,091, filed Sep. 23, 2003.

In step 1408, the flock transfer/first permanent adhesive/insert assembly is contacted with the second permanent adhesive to form the three dimensional design 1412. This step may be performed using any technique, with lamination techniques being preferred. A preferred technique is discussed in copending U.S. application Ser. No. 09/735,721, filed Dec. 13, 2000, and Ser. No. 10/455,575, filed Jun. 4, 2003.

Yet another embodiment of the composite media will be described with reference to FIGS. 12-15. The media is based on the processes described in U.S. Pat. Nos. 6,010,764 and 6,110,560, each of which is incorporated herein by this reference.

Figure 12:
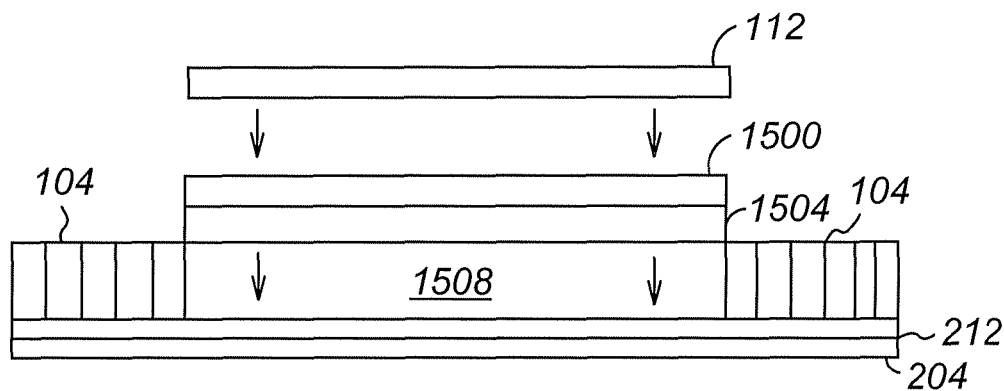
FIG. 12 is a side view of a decorative media in a first step of a production process according to an embodiment of the present invention.

With reference to FIG. 12, the process to produce the media commences by bringing together, such as by lamination techniques, a flocked release sheet, pressure sensitive adhesive 1500, and the insert 112. The flocked release sheet includes flocked areas 104 embedded in the release adhesive 212, which is applied to the carrier sheet 204. The pressure sensitive adhesive 1500 is backed by a paper backing 1504. The flocked areas 104 are discontinuous being separated by a space 1508 sized to receive the insert 112. The pressure sensitive adhesive 1500 is applied to a surface of the insert 112. The paper backing 1504 is then removed and the pressure sensitive adhesive 1500 adhered to the release adhesive 212. For better adhesion, the release adhesive 212 may be omitted from the space 1508, which is to be free of flock. The omission of the release adhesive from this area may be done using screen printing techniques. In another configuration, the tack adhesive 1500 is omitted and the release adhesive 212 included in the space 1508 to adhere the insert temporarily to the carrier sheet 204.

Figure 13:
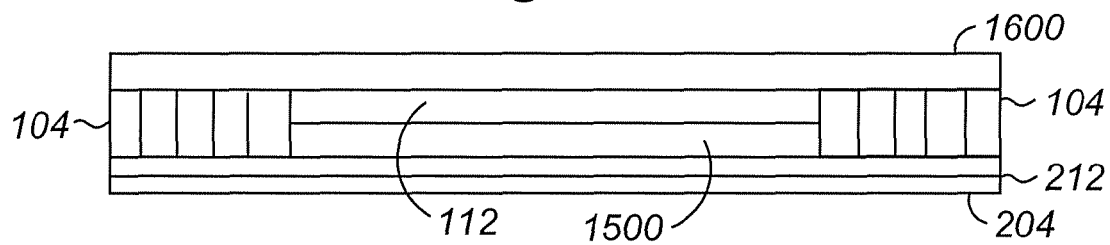
FIG. 13 is a side view of the decorative media in a second step of the production process.

With reference to FIG. 13, a layer of a hot melt adhesive 1600, whether applied as a preformed self-supporting layer, powder, or liquid, is applied to the free surfaces of the flock and the insert 112. Preferably, the hot melt adhesive 1600 is applied as a compatible hot melt powder having a grind size of preferably no more than about 250 microns, even more preferably of no more than about 225 microns and even more preferably ranging from about 40 to about 200 microns. The hot melt powder is preferably in the form of a polyester. In one configuration, the free surfaces of the flock and insert 112 are screen printed with a permanent latex fiber adhesive, which is coated with the hot melt powder. The coated hot melt powder is then dried, vacuum brushed, and cured to prepare it for application to a substrate, such as a textile.

Figure 14:
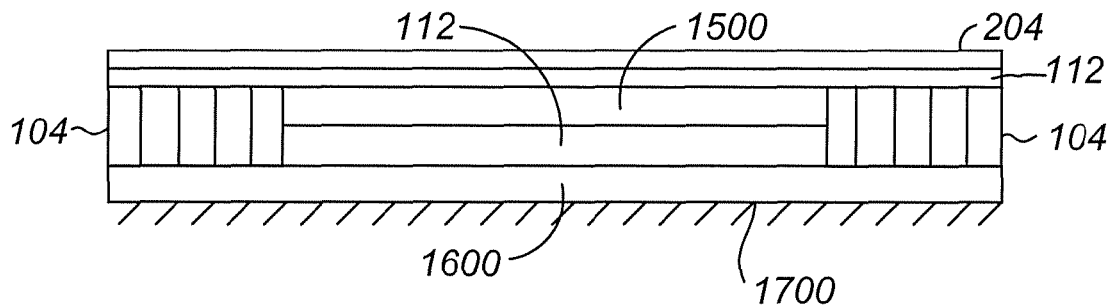
FIG. 14 is a side view of the decorative media in a third step of the production process.
Figure 15:
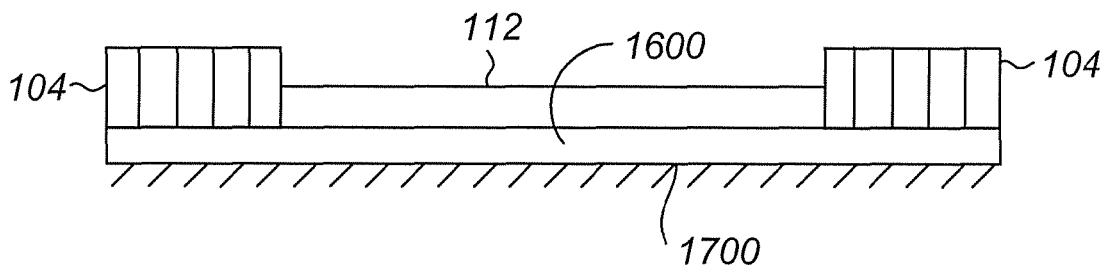
FIG. 15 is a side view of the decorative media after application to a substrate.

FIG. 14 shows the assembly being applied to a substrate 1700. The adhesive layer 1600 is applied to the substrate in the presence of heat, such as applied by an iron, to soften the hot melt adhesive and cause it to adhere to the substrate. The hot melt adhesive readily adheres the flock and insert 112 to the substrate 1700.

Referring to FIG. 14, after adherence to the substrate 1700 the carrier sheet 204, release adhesive 112, and pressure sensitive adhesive 1500 are peeled away from the media. Thus, only the flocked areas 104 and insert 112 remain permanently affixed to the substrate 1700.

A number of variations and modifications of the invention can be used. It would be possible to provide for some features of the invention without providing others.

For example, the insert can include other design media in addition to or in lieu of the metal film. The design media include, for example, glass particles (e.g., sequins), ceramic particles, textiles, and the like.

By way of further illustration, the insert 112 can be bonded directly to the porous film 116 in the absence of an intervening adhesive. The porous film 116 can be formulated to have adhesive properties.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing a flock transfer, the flock transfer comprising a carrier sheet, a release adhesive, and a flock layer, a first surface of the flock layer being adhered to the carrier sheet by the release adhesive;
   (b) applying a first permanent adhesive to a second surface of the flock layer to form a transfer assembly, the first and second surfaces being in an opposing relationship with one another;
   (c) thereafter, removing a selected portion of the flock layer from at least one of the flock transfer and transfer assembly to form a void;
   (d) positioning an insert substantially in the void of the transfer assembly, wherein the insert and the transfer assembly are positioned on a first substrate surface of a common substrate; and
   (e) adhering the transfer assembly and insert to the first substrate surface.

2. The method of claim 1, wherein the insert comprises a design and a lamination adhesive positioned between first and second polymeric films.

3. The method of claim 1, wherein the insert is adhered to the common substrate before the transfer assembly is adhered to the common substrate and wherein the insert and transfer assembly are not adhered to one another before step (e).

4. The method of claim 1, wherein the common substrate is larger than the insert, the common substrate provides an overlapping edge and wherein step (d) comprises the sub-step of applying a tack adhesive to the overlapping edge, and wherein the overlapping edge contacts the second surface of the flock.

5. The method of claim 1, wherein a second permanent adhesive is positioned between the insert an a first surface of the common substrate, and further comprising:
   (f) applying a third permanent adhesive to a second surface of the common substrate, the first and second surfaces of the common substrate being in an opposing relationship.

6. The method of claim 4, wherein the tack adhesive applied is a thermosetting adhesive.

7. A method, comprising:
   (a) providing a flock transfer, the flock transfer comprising a carrier sheet, a release adhesive, and a flock layer, a first surface of the flock layer being adhered to the carrier sheet by the release adhesive;
   (b) applying a first permanent adhesive to a second surface of the flock layer to form a transfer assembly, the first and second surfaces being in an opposing relationship with one another;
   (c) thereafter, removing a selected portion of the flock layer from at least one of the flock transfer and transfer assembly to form a void;
   (d) positioning an insert substantially in the void of the transfer assembly, wherein the insert and the transfer assembly are positioned on a first surface of a common porous film substrate; and
   (e) adhering the transfer assembly and insert to the first porous film common substrate surface.

8. The method of claim 7, wherein the insert comprises a design and a lamination adhesive positioned between first and second polymeric films.

9. The method of claim 7, wherein the insert is adhered to the porous film common substrate before the transfer assembly is adhered to the porous film common substrate and wherein the insert and transfer assembly are not adhered to one another before step (e).

10. The method of claim 7, wherein the porous film common substrate is larger than the insert, the porous film common substrate provides an overlapping edge and wherein step (d) comprises the sub-step of applying a tack adhesive to the overlapping edge, and wherein the overlapping edge contacts the second surface of the flock.

11. The method of claim 7, wherein a second permanent adhesive is positioned between the insert an a first surface of the porous film common substrate, and further comprising:
   (f) applying a third permanent adhesive to a second surface of the porous film common substrate, the first and second surfaces of the porous film common substrate being in an opposing relationship.

12. The method of claim 10, wherein the tack adhesive applied is a thermosetting adhesive.

* * * * *